Oct. 4, 1938.   B. A. WITTKUHNS ET AL   2,131,993
SONIC DEPTH AND HEIGHT INDICATOR
Filed March 17, 1932    2 Sheets-Sheet 1
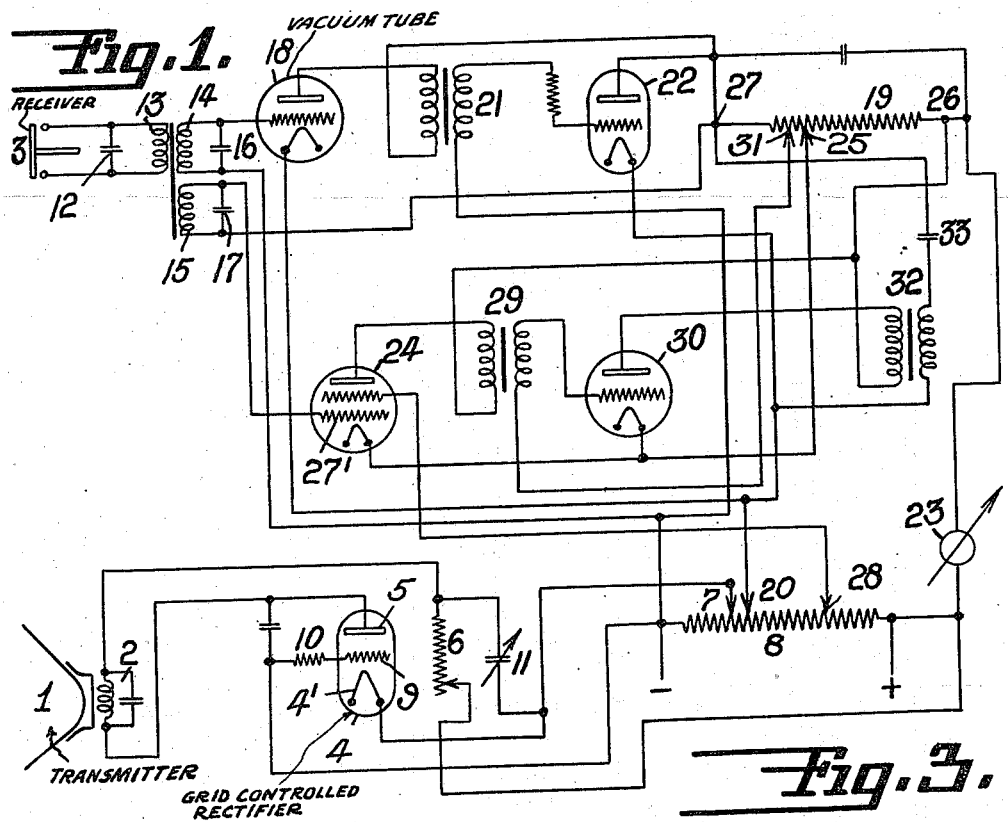
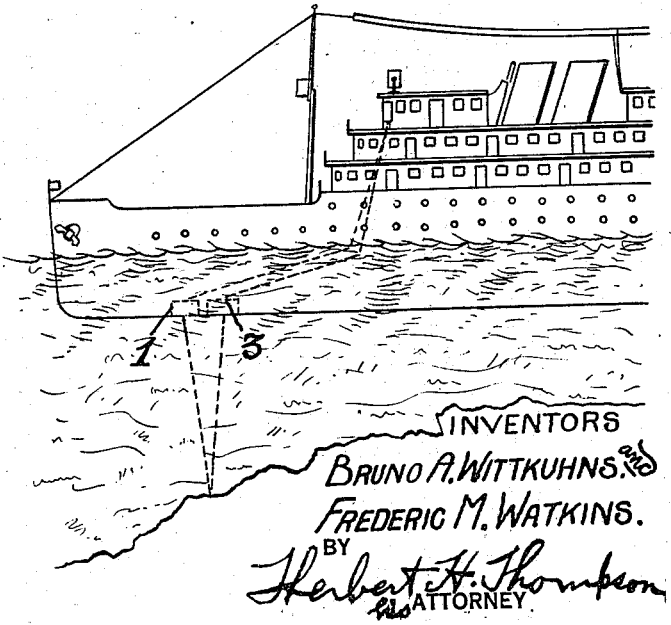
INVENTORS
BRUNO A. WITTKUHNS
FREDERIC M. WATKINS.
BY
Herbert H. Thompson
ATTORNEY

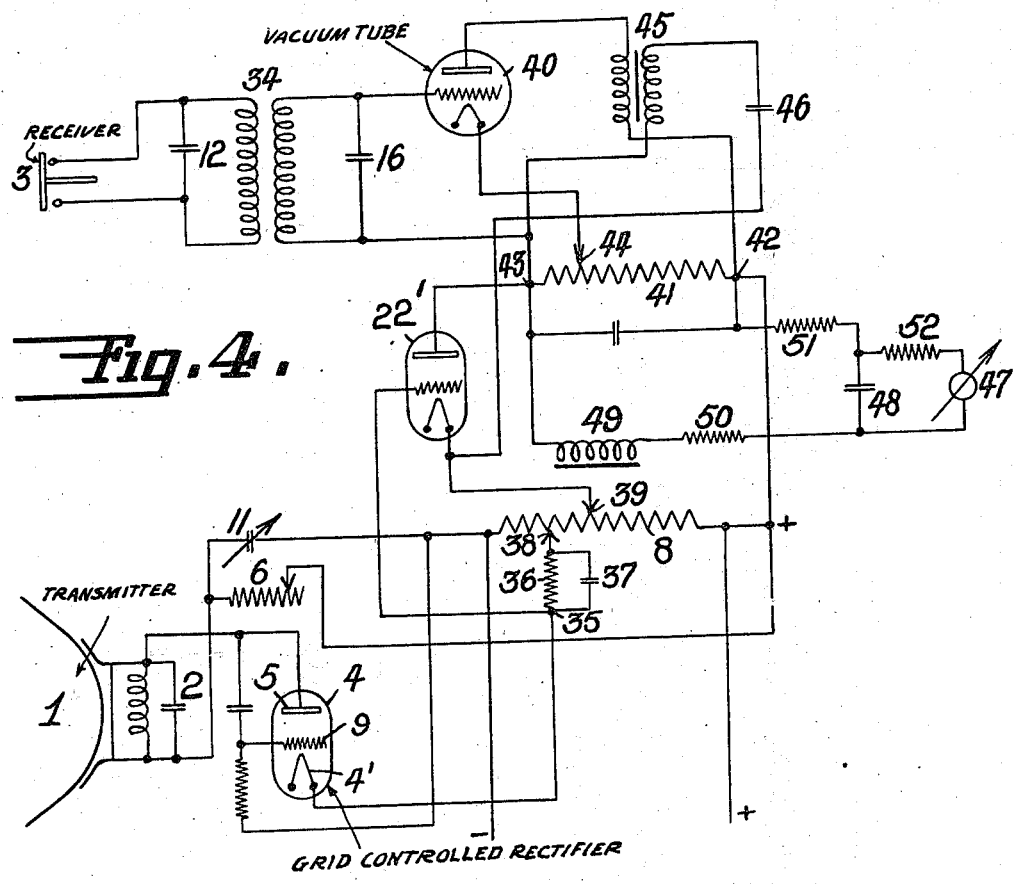

Patented Oct. 4, 1938

2,131,993

UNITED STATES PATENT OFFICE 2,131,993

SONIC DEPTH AND HEIGHT INDICATOR

Bruno A. Wittkuhns, Summit, N. J., and Frederic M. Watkins, Forest Hills, N. Y., assignors to Sperry Gyroscope Company, Inc., Brooklyn, N. Y., a corporation of New York Application March 17, 1932, Serial No. 599,432

6 Claims. (Cl. 177—386)

This invention relates to means and method for measuring distance by timing the elapsed time between the transmission of a sound impulse and the return of the echo. The invention relates especially to determining the depth of water under the hull of a ship by timing the echo from a sound transmitted through the water to the floor of the ocean and return. Obviously our invention is also adapted for use by an aviator in determining his height above the ground in case the ground should be concealed by fog. The devices heretofore proposed which operate on this general principle have involved complicated systems of rotating discs, flashing light beams and other moving and delicate machinery likely to get out of order. Prior devices have also been largely handicapped by the fact that they are likely to be actuated by the primary sound as well as by the echo and the inability of the device to distinguish between the primary sound and the echo. Obviously our invention, being primarily a timing device, may be used to measure time intervals, especially those of a recurring nature.

According to our invention, we have eliminated all moving parts, contacts and mechanical relays and employ a system of tuned thermionic circuits both to transmit the primary sound and to receive the echo. By our invention also we prevent disturbance of the apparatus by the primary or other foreign sounds preferably by rendering the device inoperative until the primary sound is transmitted and activating or energizing the system by the transmission of the primary sound. Owing to the extremely short period to be timed, we prefer not to rely solely on timing a single echo but transmit at periodic intervals repeated sound impulses, the echo from which is continuously received by the apparatus. The transmission of the primary sound energizes the receiving circuit while the echo deenergizes the same. Thus this circuit is energized periodically for the time taken for the echo to return to the ship and it remains deenergized until the next impulse is transmitted. By using an averaging meter in this circuit an indication of the average time intervals may be secured which, therefore, furnishes a direct indication of the depth.

Referring to the drawings,

Fig. 1 is a wiring diagram showing the preferred form of our invention.

Fig. 2 is a front view of one form of indicator showing how it may also be used as a recorder.

Fig. 3 is a diagram showing how our invention may be mounted on a ship and the principle of operation of the same.

Fig. 4 is a wiring diagram illustrating one of the many forms that our invention may assume.

Any suitable transmitter 1 of mechanical energy in the form of either sonic or supersonic waves is used to set up the waves in the water under the hull of the ship. Said transmitter is preferably located in the bottom of the ship and is actuated by an impulse of direct current, this impulse actuating a tuned circuit 2 to produce sound waves of known frequency. A receiver 3 of the microphone type adapted to be actuated by wave motion of the kind emitted by the transmitter 1 is located preferably adjacent the transmitter.

A grid-controlled gas or vapor rectifier 4, commonly known as a grid-glow tube or grid controlled rectifier and having its filament heated by a separate source of supply (not shown) is connected to a source of D. C. in such a way as to pass current for a very brief interval of time in every predetermined interval, say every two seconds. By adjusting the constants of the circuit any suitable time interval may be selected. The plate 5 of the tube is connected through the transmitter 2 and through a resistance 6, to the positive side of the supply. The filament 4' of the tube 4 is connected to some intermediate point 7 on a potentiometer 8, which is placed across the supply and serves as a voltage divider. Point 7 is selected in such a way that the grid 9 of the tube 4, which is connected through a resistance 10 to the negative terminal of supply, has a slightly negative potential with respect to filament 4' of the tube. A large condenser 11 is connected with one terminal between the transmitter 2 and the resistance 6 and with its other end to the filament of the tube. A condenser 11' is connected to plate 5 and to a point between resistance 10 and the negative terminal of the supply. If the circuit is energized, the condenser 11 will start to charge through the resistor 6. This creates a voltage drop along the resistor 6 of sufficient magnitude to keep the plate voltage of the tube below its starting point. The more the condenser 11 is charged, the smaller the current flowing through the resistor 6, so that a point is reached where the voltage drop of this resistor gets small enough to allow the tube to start. It then discharges the condenser 11 suddenly. Condenser 11' at the same time discharges through the tube 4 and through that part of the potentiometer 8 which is between point 7 and the negative terminal, thereby making the grid 9 of the tube more negative. As soon as the discharge is finished, the tube 4 will go out because the plate potential has dropped again to below its starting point. The condenser will charge again and the whole action is repeated. The time cycle of this action is governed only by the value of the resistor 6 and the condenser 11. As said before, any desired time constant may be selected by adjusting the values of the resistor 6 or the condenser 11.

The extremely short discharge through the tube 4 passes through the tuned circuit 2 of the transmitter and there actuates the element 1 which emits the sound waves. These sound waves will travel toward the bottom of the sea and will be reflected from there as an echo. But also direct sound waves will travel to the receiver 3 long before the echo has returned. We may utilize the transmission of these sound waves either directly or indirectly to energize a tuned circuit consisting of a condenser 12 and a set of transformer coils 13, 14 and 15. In the main form of the invention, the transmission of sound is used indirectly by employing the primary sound waves which almost immediately arrive at the receiver 3 to energize said receiver. These coils 13, 14 and 15 are the primary and two secondaries respectively of a transformer, the secondaries 14 and 15 being tuned by condensers 16 and 17. A vacuum tube 18 (the filament supply of which is also not shown) gets its plate voltage from the positive terminal of the supply through a resistor 19. Its grid is connected through the coil 14 to the negative terminal of the supply, while its filament is connected to point 20 on the potentiometer 8 across the supply source, thereby insuring the proper negative bias on the tube 18. In the plate circuit of the tube 18 is located a transformer 21, the secondary of which is connected between the grid of a grid glow tube or grid controlled rectifier 22 and the negative terminal of the supply on the potentiometer 8. The plate of the grid glow tube 22 receives its plate voltage through the same resistor 19 from the positive terminal supply through an indicating instrument 23.

Suppose that a sound is emitted from the transmitter 1, which directly energizes the receiver 3. In that case the tuned circuits will energize the grid of the tube 18 if the sound received will resonate the tuned circuits, which should be tuned exactly to the same frequency as the sound to be received. The A. C. on the grid of tube 18 will be amplified in its plate circuit and will further be amplified in transformer 21 and arrive at the grid of the grid glow tube 22 with a relatively high value. As can be seen in the wiring diagram, the grid glow tube 22 has a negative grid potential due to the face that its filament (of which the heating supply is not shown) is connected to point 20 on the potentiometer 8, while the grid is connected to the negative terminal of this potentiometer. The amplitude of the A. C. superimposed on the negative grid potential of tube 22 is high enough to overcome this potential and make the grid sufficiently positive to start the grid glow tube. As the grid glow tube is on a D. C. supply, it will not cease to pass current as soon as the grid impulse is removed. In other words, the grid glow tube 22 begins to pass current as soon as a direct sound from transmitter 1 is received on the microphone 3; which is immediately upon the emission of the sound, because transmitter and receiver are preferably located near enough to each other so that there is no appreciable time lag between the emission of the sound and its receipt on the microphone 3. As soon as tube 22 passes current, the potential of its plate with respect to its filament is reduced to the internal voltage drop of a grid-glow tube. That means that the tube 18 will become inoperative because its plate potential also drops down to approximately that level. Along the resistor 19 we now have a voltage drop which is substantially less than the supply voltage, if we neglect the few volts of negative grid potential as indicated by the position of the taps on the potentiometer.

This voltage drop on the resistor 19 is now utilized to provide plate voltage to a tube 24, which is of the screen grid type for maximum sensitivity and is in circuit with secondary 15 of transformer 13 so as to be actuated upon receipt of the echo. Its filament, whose supply is not shown, is connected to point 25 on the resistor 19, while its plate is connected to terminal 26 of said resistor. Its grid 27' is connected to the terminal 27 of resistor 19 in order to obtain negative grid bias. The screen voltage is adjusted by a slider 28 from the main potentiometer 8. In the plate circuit of the tube 24 is located a high impedance transformer 29, the secondary of which is connected between the grid of the power tube 30 and a point 31 on the resistor 19. The filament of this power tube is connected to point 25 on resistor 19, so that its grid is negatively biased. In the plate circuit of tube 30, there is connected a primary of transformer 32, through which the plate current passes through the tube 30 from terminal 26 of the resistor 19. The secondary winding of transformer 32 is connected in series with a condenser 33 to the plate and the filament of grid glow tube 22. If an impulse actuates the grid of tube 24, this impulse would be amplified through transformer 29 and further amplified in the power tube 30, the output of which will create a high amplitude A. C. in the secondary of the transformer 32. This A. C., if applied across the tube 22, will make its plate potential negative for an instant so that the grid glow tube 22 will stop passing current, its grid being negative.

We have the following cycle of operation. Tube 4 energizes for a very short time the transmitter 1, which emits a short sound. This sound travels directly to receiver 3 and through the action of vacuum tube 18 starts the grid glow tube 22, thereby reducing its own plate voltage so that vacuum tube 18 from now on is inoperative. By starting the grid glow tube 22, the tubes 24 and 30 are energized and supplied with plate and grid potential, but prior to that time said tubes are inoperative and do not respond, therefore, to the primary sound. In the meantime, the sound waves have been travelling to the bottom of the sea and return as an echo which again strikes the receiver 3, thereby actuating the second tuned circuit 15—17, which is the grid circuit for the screen grid tube 24. The echo impulse is further amplified in power tube 30 and a high amplitude A. C. is placed across the grid glow tube 22, which thereby is stopped. The stopping of this tube reactivates vacuum tube 18, which is now ready for another cycle of operation.

This second cycle starts automatically as soon as grid glow tube 4 is again tripped by the action of condenser 11 and the whole cycle of operation repeats itself at equal intervals, which are only governed by the action of tube 4. The instrument 23, which is located in the plate circuit of grid glow tube 22, is an integrating instrument so that it measures the average current over a certain period of time, say, 4 or 5 seconds. Such an instrument may use any well known type of moving coil, D. C. ammeter, if the moving coil is given a high inertia and excessive damping. Such an instrument will follow an impulse of current very slowly and if that impulse is removed will also very slowly return to its zero position. Therefore, if a number of impulses are put through the instrument in equal time intervals and the value of the impulses is constant as well as the lengths of their duration, the meter will finally assume a position which is proportional to the time during which each impulse has been passing the instrument. In other words, the instrument will show higher readings if the duration of each impulse gets longer, and it will show lower readings when the duration of each impulse gets shorter. It is, therefore, possible to calibrate the scale of the instrument so that it shows actual duration of time during which each impulse has been flowing. It also is obvious that an error which may happen due to any number of causes and which will result in one of the impulses being either extremely long or extremely short will not make any great error in the instrument, as it needs considerable time, preferably 3 or 4 times as much as the cycle of the grid-glow tube, to give a definite registration. This averaging action will, therefore, insure a steady position of the pointer.

From the foregoing, it is obvious that the time through which each current impulse will flow through the meter is governed only by the time elapsing between emitting the sound from transmitter 1 and the time at which the echo is received at the receiver 3. The shortest possible time is that in which the echo arrives at the receiver 3 at exactly the same time at which the direct sound arrives there. This would mean that the depth of the water under the ship must be one-half of the distance between the transmitter and the receiver. Since the latter may be made small, the instrument can measure very shallow as well as greater depths.

The time cycle for the tube 4 has to be selected according to the maximum depth of water to be measured. For all normal purposes on shipboard, a time cycle of 2 seconds is sufficient, as this will measure a depth of about 800 fathoms. It is possible to measure greater depths by changing the time constant of tube 4. There is no definite limit to which depths could be measured, because the vacuum tube 24 could be replaced by a sensitive group of tubes so that there would be more than one stage of amplification in order to receive very weak echoes.

The danger of misreadings due to stray noises and other errors is minimized by the type of instrument used, which will not show an isolated misreading, and also by careful tuning of the tuned circuits energizing the vacuum tubes. It is possible to go to high frequencies which are beyond the usual range of noises, the only limit for the frequency being the de-ionization time of the grid glow tube 22, which has to be stopped by the high frequency current output of transformer 32. Even this difficulty can be overcome by changing the frequency by means of a superheterodyne circuit so that the frequency by which grid glow tube 22 is stopped is considerably lower than that bordering on the limit of de-ionization time.

One great advantage of our invention is that there is not a single moving part in the whole arrangement. Instead of contacting relays, we employ electronic tubes of high efficiency and sensitivity and instead of a rotating timing device a very accurate automatically timed grid-glow tube is employed. This insures continuous service without any adjustments or repairs and, inasmuch as the instrument is not likely to be used twenty-four hours a day nor for days at a time, the life of the tubes is long enough to keep the necessary tube replacements down to a very reasonable level. It is also not necessary to have the indicator near the apparatus. Due to the relatively small current flowing through the indicating meter, it can be placed anywhere on the ship.

Fig. 4 shows one of the modifications that our invention may assume. It contains the same transmitter 1 with its tuned circuit 2 and the same receiver 3 with only one tuned circuit 34. The signal transmitting device again is the grid-glow tube 4 with its resistance 6 and condenser 11, and the tube also is energized from potentiometer 8 placed across the supply terminals. In this form the vacuum tube 18 may be omitted entirely and the grid glow tube 22' started by the direct action of the tube 4. The grid of the tube 22' is connected to terminal 35 of a resistor 36, which in turn is bridged by a condenser 37. The other terminal of resistor 36 is connected to point 38 of the potentiometer 8. The filament of tube 4 is also connected to point 35. The plate current of the discharging grid glow tube 4 passes through resistor 36, thereby making point 35 more positive than point 38. If the voltage drop between the points 38 and 35 is made equal or larger than the voltage drop between point 38 and point 39, to which the filament of tube 22' is connected; the grid of tube 22 will be made positive for an instant during the discharge of tube 4, which will trip grid glow tube 22' and start its plate current. The condenser 37 serves the purpose of introducing a small time lag into the tripping of the grid glow tube 22' so that this tube should not start before the direct sound from transmitter 1 has reached receiver 3, but immediately afterward. The vacuum tube 40 receives its entire supply from a resistor 41, which may be identical in its action to the resistor 19 in Fig. 1. The plate of vacuum tube 40 is connected to terminal 42 and its grid to terminal 43. Its filament is connected to point 44 so that the grid has a sufficient negative bias. The tube 40 is ready for action as soon as grid glow tube 22' has been started. As soon as the echo strikes receiver 3, the grid of tube 40 will be energized and will create in the transformer 45 an A. C., which is further amplified in the secondary winding of that transformer. As in Fig. 1, this secondary winding applies its A. C. through a condenser 46 across plate and filament of tube 22'. The amplitude of this A. C. has only to be large enough to overcome the internal voltage drop of the tube so that it makes the plate negative for an instant, which is enough to stop the plate current of that tube. The time cycle and the whole operation is otherwise substantially identical with Fig. 1. Tube 4 starts and actuates the transmitter and also actuates and starts tube 22'. This tube 22' starts only a fraction of time after the direct sound has hit the receiver 3. By its starting, it energizes tube 40, which amplifies the echo and uses this energy to stop tube 22'.

The indicating instrument 47 is slightly different than in Fig. 1. The large condenser 48 is being charged slowly through choke 49 and the resistors 50 and 51. The charge can leak off across the resistor 41 and also across the resistor 52 and the instrument 47. The level to which the condenser is being charged depends on the time during which current flows through the resistor 41. If there were current flowing continuously through said resistor, the condenser 48 would charge up to the level of the potential drop across the resistor, and furthermore a continuous current would flow through resistor 52 and meter 47 and give the same its maximum reading. If now the current through resistor 41 is interrupted, the condenser will discharge two ways as explained before, but very slowly due to the high value of the resistances employed. We prefer to make the total discharge time of the condenser as much as thirty or more seconds. This shows clearly that if an interrupted current is passed through resistor 41, the instrument 47 will finally obtain a level which is proportional to the average amount of current flowing in that resistor. In other words, this instrument preferably has high electrical inertia instead of high mechanical inertia, as in the one described before for Fig. 1.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In an echo depth meter, a receiver, a plurality of electronic tubes connected therewith including vacuum tubes and a grid glow tube, means including said receiver and one of said vacuum tubes for tripping said glow tube upon receipt of a primary sound by said receiver, means for energizing said other vacuum tubes by the output of said glow tube, means for deenergizing said first mentioned vacuum tube by said glow tube, an indicator in circuit with said glow tube to show depth, and means actuated by the amplification of the echo signal in said other tubes for cutting off the discharge of said glow tube, thereby effecting the deenergization of said other tubes and the energization of said first mentioned tube.

2. In an echo depth meter, a receiver, a plurality of electronic tubes connected therewith including vacuum tubes and a grid glow tube, means including said receiver and one of said vacuum tubes for tripping said glow tube upon receipt of a primary sound by said receiver, means in the circuit of said grid glow tube for energizing said other vacuum tubes and deenergizing said first mentioned vacuum tube while said glow tube passes current, an averaging meter in circuit with said glow tube to show depth, and means actuated by the amplification of the echo signal in said other tubes for cutting off the discharge of said glow tube to effect the deenergizing of said other tubes, said first named tube being reactivated by the deenergization of said glow tube.

3. In an echo depth meter, a receiver, two vacuum tube amplifiers, means connecting the output of the receiver to the input of the amplifiers, means for normally energizing one of said amplifiers to enable said amplifier to amplify a primary sound received by said receiver, a grid glow tube, connecting means between said amplifier and said grid glow tube whereby said grid glow tube will be tripped by the amplified output of said amplifier, connecting means between the said glow tube and the other of said amplifiers whereby said other of said amplifiers will be energized to receive the echo while the said glow tube is passing current, a power amplifier, means connecting the output of said other amplifier to the input of said power amplifier, and means connecting the A. C. output of said power amplifier to the plate circuit of said glow tube whereby the same is cut off on receipt of the echo.

4. In an echo depth meter, electrical means for automatically transmitting a sound at regular rapid intervals, a sound receiver, a glow tube circuit including a glow tube, delayed action means for interconnecting said electrical means and said glow tube circuit whereby said glow tube will be tripped to pass current by energy from said electrical means each time a sound is transmitted, an averaging meter in said glow tube circuit calibrated to show depth, and means actuated by said receiver on receipt of each echo for cutting off the current through said glow tube and said averaging meter.

5. In an echo depth meter, means for transmitting a sound at regular rapid intervals, a receiver, amplifying means to amplify the output of the receiver, a grid glow tube circuit including a grid glow tube, means electrically actuated by said transmitting means each time a sound is transmitted, for tripping the grid glow tube to pass current, means connecting the grid glow tube circuit and the amplifying means whereby the amplifying means is operative only during the period that the discharge tube is passing current, means for superimposing the amplified A. C. from said amplifying means caused by said echo across the grid glow tube to cut off the current through the grid glow tube, and a time indicating means in said grid glow circuit.

6. In a sonic depth finder, a grid glow tube, means for normally supplying D. C. to the plate thereof and sufficient negative bias to the grid to prevent starting, means in the grid circuit of said tube to trip the tube on transmission of the primary sound, a normally inert electronic tube circuit, means interconnecting the said grid glow tube circuit and the said electronic tube circuit whereby the latter circuit will be rendered operative by the tripping of said tube, a sound receiver, means connecting said sound receiver to said electronic tube circuit whereby A. C. signals created by said receiver are amplified by the tube circuit, means connecting the output of said electronic tube circuit to the said grid glow tube circuit whereby said amplified signals are superimposed on the plate of said grid glow tube to stop the same.

BRUNO A. WITTKUHNS.
FREDERIC M. WATKINS.